Patented Apr. 7, 1953

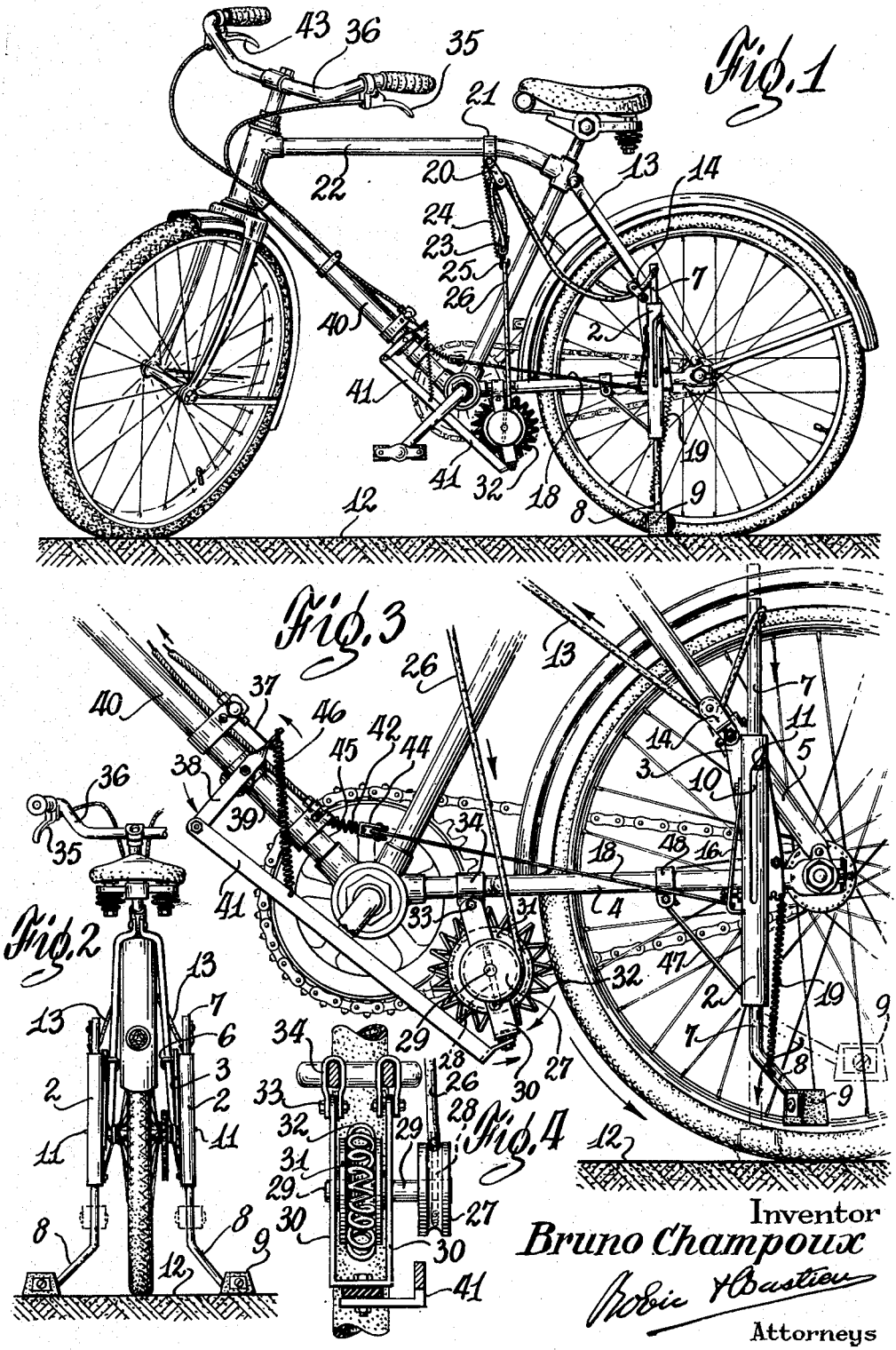

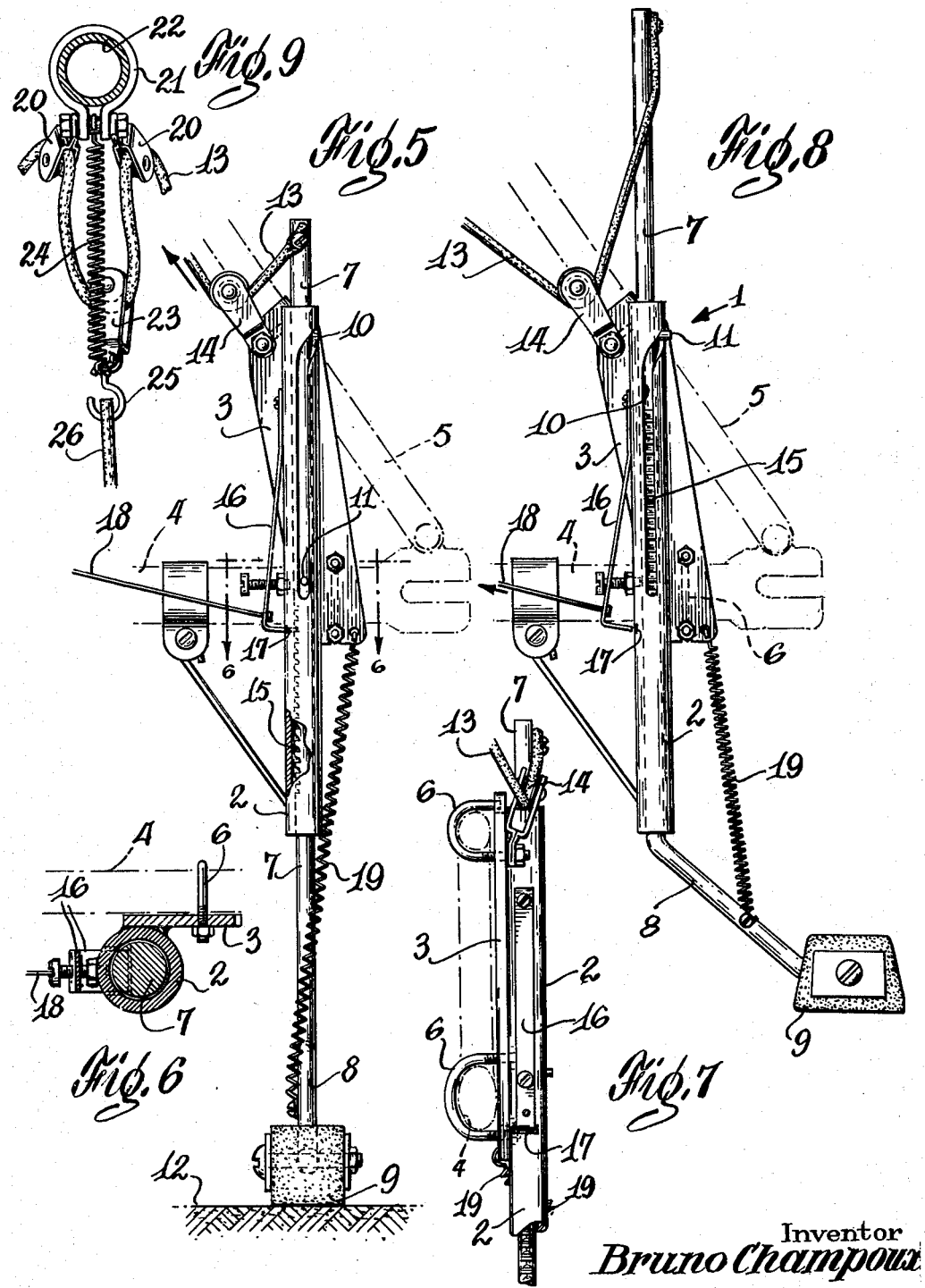

2,633,934

UNITED STATES PATENT OFFICE 2,633,934

COMBINATION BICYCLE SUPPORT AND BRAKE

Bruno Champoux, Ville St.-Laurent, Quebec, Canada

Application December 16, 1949, Serial No. 133,365

6 Claims. (Cl. 188—5)

The present invention relates to bicycle support means and more particularly to bicycle support means which may also be used as a bicycle brake.

The main object according to the present invention is the provision of means for supporting a bicycle when at rest, said means being extendible from an out of the way position to frictionally engage the road upon which the bicycle is moving in order to act as brakes.

Another important object according to the present invention is the provision of support means for a bicycle which are operable by one of the moving wheels on the bicycle in order to extend into frictional contact with the road on which the bicycle is moving.

Still another important object according to the present invention is the provision of a bicycle support which may be extended into or retracted from the operative position by the rider of the bicycle when seated thereon.

Still another important object according to the present invention is the provision of braking means for a bicycle which has a novel character and which may at the same time be used as a bicycle support.

A further important object according to the present invention is to provide in a bicycle support means of the character described which are simple and easy to manufacture and which are easy to operate.

The foregoing and other important objects according to the present invention will become more apparent during the following disclosure and by referring to the drawings in which:

Figure 1 is an elevation view of a bicycle provided with the support and braking means according to the present invention;

Figure 2 is a rear elevation view of the same;

Figure 3 is an enlarged elevation view of the same;

Figure 4 is a front elevation view of the frictional wheel engaging the rear wheel of the bicycle;

Figure 5 is an enlarged elevational view of a support according to the present invention in extended operative position;

Figure 6 is a cross section along line 6—6 of Figure 5;

Figure 7 is a fractional front elevation of the support means shown in Figure 5;

Figure 8 is a side elevation of the support means in retracted position, and,

Figure 9 is a detailed view of part of the cable means according to the present invention, fastened to the top horizontal frame member of the bicycle shown in cross section.

Referring now more particularly to the drawings in which like reference characters indicate like elements throughout, numeral 1 indicates the support member according to this invention fastened to the bicycle frame, adjacent the rear wheel axis of the bicycle, and on both sides of said wheel.

Each support member comprises a straight barrel 2 welded or otherwise rigidly secured to a base plate 3, the latter being fastened to one branch of the horizontal fork 4 of the bicycle and to one branch of the downwardly inclined fork 5 of the same by means of U-shape clamps 6.

Inside each barrel 2 is vertically slidable a straight rod 7, bent at its lower portion 8, from the free end of which is dependent a brake shoe 9 which is preferably interchangeable and made of rubber or the like. The barrel 2 is provided with a spirally disposed slot 10 through which protrudes a stud 11 rigidly secured to the rod 7. Thus upon a downward movement of rod 7, the same is rotated by means of the stud 11 and slot 10, whereby the brake shoe 9 describes an outward and downward movement in order to engage the road surface 12.

This movement of the rod 7 and brake shoe 9 is provided by means of a suitable cable 13 attached at the upper free end of the rod 7 and passing through a suitable pulley 14 itself attached to the upper end of the base plate 3.

In order to maintain the rod 7 and brake shoe 9 in extended position, said rod 7 is provided with a series of ratchet teeth 15 extending longitudinally thereof and engageable by the free end of a leaf spring 16 secured to the exterior of the barrel 2 and tending to protrude through a transverse slot 17 made in said barrel. Thus the support member according to the invention may be locked into any intended position once the brake shoe 9 has assumed its outward position.

A suitable cable 18 is attached at the lower end of the leaf spring 16 in order to disengage the same from the ratchet teeth 15 of the rod 7. A suitable spring 19 will then urge said rod 7 into its retracted upward position. Said spring 19 is attached at one end to the lower portion of the base plate 3 and at its other end to the bent portion 8 of the rod 7.

In order to urge downwardly the support member in its extended position by means of cable 13, the latter is associated with the following control and actuating mechanism.

Said cable 13 engages a suitable pulley 20, fastened to a collar 21 preferably provided at the upper horizontal frame member 22 of the bicycle, then the cable 13 passes through a pulley 23 loosely held by means of a spring 24 attached at the other end to the collar 21. The cable 13 then passes through another pulley 20 fastened to the collar 21 and extends on the other side of the rear wheel of the bicycle to be attached to the upper end of the rod 7 of the other support member.

The pulley 23 is provided with a hook 25 to which is attached one end of the controlled cable 26 which extends downwardly and has its other end wound around a suitable grooved wheel 27 and attached thereto by means of a pin 28. Said pin 28 extends through the wheel 27 and maintains the same in rigid engagement with the shaft 29 itself horizontally disposed and supported by a U-shape member 30. Disposed between the two legs of said member 30 and rotatably supported by said shaft 29 is a frictional wheel 31 preferably grooved at its periphery to receive a suitable coiled wire 32 bent in such a manner as to completely enclose the periphery of said wheel 31. The U-shape member 30 is pivoted at its upper end 33 to a collar 34 enclosing and fastened to the front portion of the horizontal fork 4 of the bicycle.

Thus the frictional wheel 31 is displaceable in the plane containing the rear wheel of the bicycle and is adapted to come into frictional engagement therewith.

When such an engagement is made during movement of the bicycle, the frictional wheel 31 will rotate, together with dependent grooved wheel 27 in such a direction of rotation as to wind the cable 26 around the latter, thereby exerting a suitable pull on the cable 13 which will in turn cause the rod 7 to extend downwardly into operative position.

In fact, the coiled wire 32 of the frictional wheel 31 will prevent any slippage between said wheel and the rear wheel of the bicycle, such that an appreciable braking action will be exerted on the brake shoes 9 when the bicycle is in movement. It should be noted that such a braking action will be exerted both at the contact face of said brake shoes 9 and at the contact point between the rear wheel of the bicycle and the frictional wheel 31.

The frictional wheel 31 is brought into engagement with the rear wheel of the bicycle by means of a suitable control handle 35 affixed to the steering handle 36 of the bicycle and actuating the usual flexible control cable 37, the free end of which is connected to a lever 38 pivoted to a collar 39 attached to the frame member 40 of the bicycle and having its other end hingedly linked to a tie member 41, the latter being loosely attached to the lower end of the U-shape member 30 supporting said frictional wheel 31.

Thus upon a forward movement of the bicycle, and upon actuation of the control handle 35, the various elements according to the present invention will be actuated in the direction of the arrows as shown in Figure 3, and the support member will be urged downwardly in contact with the road surface.

To release the leaf spring 16 by means of the cable 18, out of engagement with the ratchet teeth 15 of the straight rod 7, said cable 18 is pulled by means of a control cable 42 itself actuated by the control handle 43 at the steering handle 36 of the bicycle.

In order to equalize the tension on the leaf spring 16 of the support members on both sides of the rear wheel of the bicycle, the cable 18 has its both ends attached to said leaf spring 16 and passes around a suitable pulley 44 secured to the free end of the control cable 42. A suitable spring 45 is also provided at said pulley 44 in order to release the latter and also the cable 18 from its stretched position, thereby allowing the leaf spring 16 to re-engage the ratchet teeth 15 of the straight rod 7 in order to maintain the same in its retracted upward position. Similarly, a spring 46 is also provided between the tie member 41 for displacement of the frictional wheel 31, and the lever 38 at its upper end adjacent its attachment to the control cable, in order to urge the frictional wheel 31 into its forward non-engaging position.

To reinforce the support members 1 when the same are used as brakes, a stay rod 47 is fastened to the lower part of the barrel 2 and to one branch of the fork 4 by means of a collar 48.

When two support members 1, one on each side of the rear wheel of the bicycle, are used in conjunction with the frictional wheel 31 for actuating the same, these attachments according to the present invention become very useful, more particularly in city streets having a heavy traffic, because the rider seated on a bicycle equipped with the device according to the present invention may ride such a bicycle without ever dismounting the same.

While a preferred embodiment according to the present invention has been illustrated and described, it is understood that various modifications may be resorted to without departing from the spirit and scope of the appended claims.

Having thus described my invention, I claim:

1. In a bicycle having a rear axis and a wheel thereon, in combination, support and braking means comprising a tubular barrel near said rear wheel axis, fixed to the frame of the bicycle on each side thereof and directed towards the ground, rods slidable in said barrels, brake shoes dependent from said rods to engage the ground when said rods are in extended position, springs secured to said frame and to said rods to urge retraction of the latter, a first cable secured at both ends to said rods, a second cable slidably attached at one end to said first cable, a frictional wheel mounted on the bicycle frame and engageable with one of the bicycle wheels to be rotated thereby, the other end of said second cable connected to said frictional wheel to be pulled upon rotation of the same whereby said second cable will pull said first cable to extend said rods.

2. Support and braking means as claimed in claim 1, including spring urged means to lock said rods in adjusted extended position, and means to disengage said locking means.

3. Support and braking means as claimed in claim 2, including independent control means accessible to the driver of the bicycle to disengage said locking means and to engage said frictional wheel with said wheel of the bicycle.

4. Support and braking means as claimed in claim 3, wherein said frictional wheel is spring urged out of engagement with said bicycle wheel.

5. Support and braking means as claimed in claim 4, including a coiled wire secured to the periphery of said frictional wheel to contact said bicycle wheel and prevent slippage therebetween.

6. Support and braking means as claimed in claim 5, including a support member hinged to the bicycle frame and rotatably carrying said frictional wheel, said support member pivotable in the plane containing said bicycle wheel.

BRUNO CHAMPOUX.

REFERENCES CITED

The following references are of record in the file of this patent:

UNITED STATES PATENTS

| Number | Name | Date |
|---|---|---|
| 480,441 | Siar et al. | Aug. 9, 1892 |
| 486,464 | Haag | Nov. 22, 1892 |
| 529,700 | Bramall | Nov. 27, 1894 |
| 566,071 | Flatt | Aug. 18, 1896 |
| 624,285 | Zimmerman | May 2, 1899 |
| 634,480 | Schreiber | Oct. 10, 1899 |

FOREIGN PATENTS

| Number | Country | Date |
|---|---|---|
| 167,990 | Switzerland | Mar. 15, 1934 |